Figure 1:
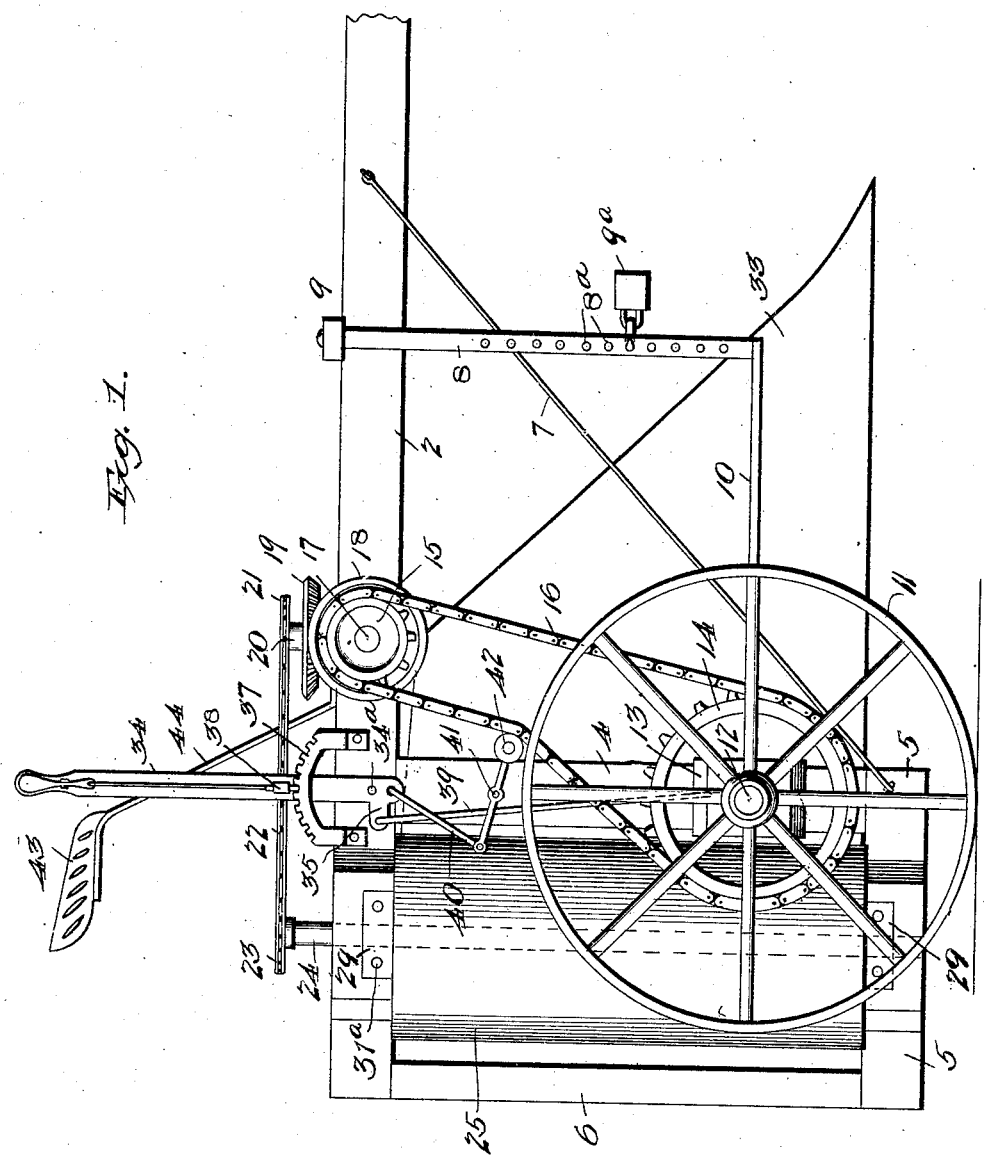

No. 840,784. PATENTED JAN. 8, 1907.
W. I. LOWE.
MACHINE FOR OPENING COTTON BOLLS.
APPLICATION FILED APR. 24, 1906.

3 SHEETS—SHEET 1.

Witnesses
T. L. Hockaum
James F. Crown

Inventor
W. I. Lowe
By Freer & Partlow
Attorneys

No. 840,784. PATENTED JAN. 8, 1907.
W. I. LOWE.
MACHINE FOR OPENING COTTON BOLLS.
APPLICATION FILED APR. 24, 1906.
3 SHEETS—SHEET 2.
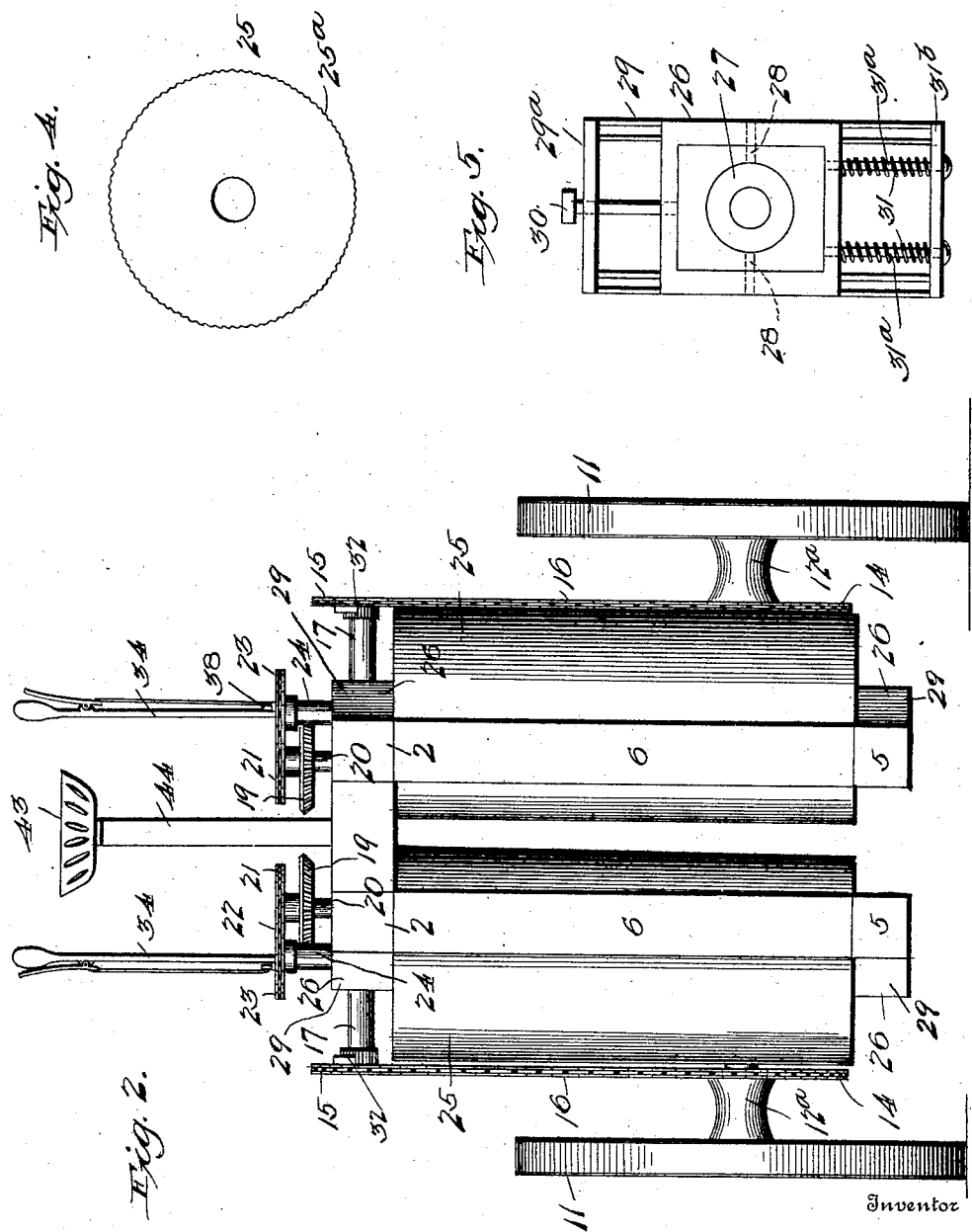

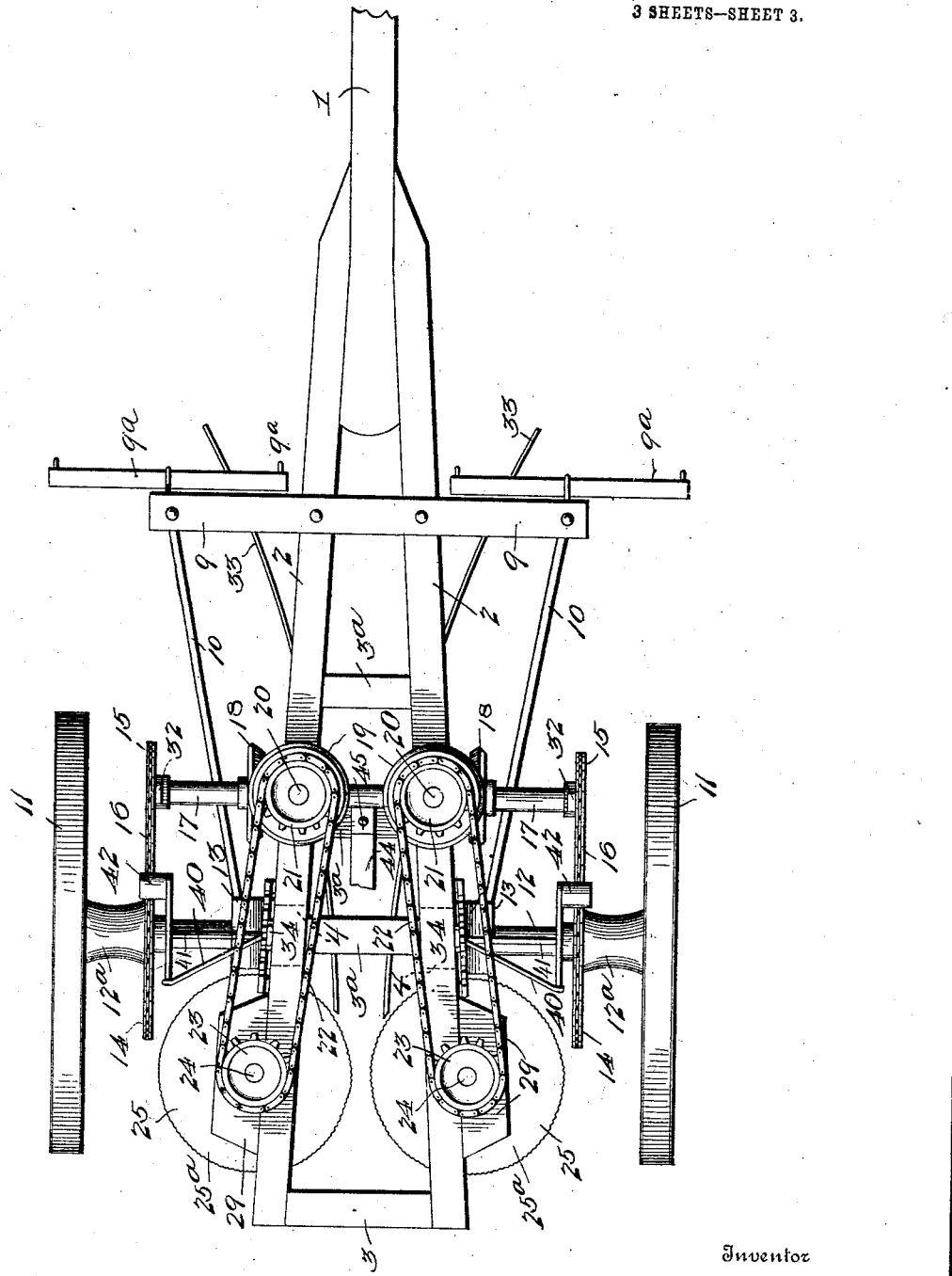

UNITED STATES PATENT OFFICE.

WILLIAM I. LOWE, OF SENTINEL, OKLAHOMA TERRITORY.

MACHINE FOR OPENING COTTON-BOLLS.

No. 840,784.      Specification of Letters Patent.      Patented Jan. 8, 1907.

Application filed April 24, 1906. Serial No. 313,472.

*To all whom it may concern:*

Be it known that I, WILLIAM I. LOWE, a citizen of the United States, residing at Sentinel, in the county of Washita and Territory of Oklahoma, have invented new and useful Improvements in Machines for Opening Cotton-Bolls, of which the following is a specification.

This invention relates to a machine for opening cotton-bolls which owing to injury of the stalks by frost or other cause would not naturally open, thereby assisting the cotton to mature and become marketable.

The object of my invention is to provide for gently mashing or squeezing immature cotton-bolls on frosted plants or mature bolls on large bottom-land cotton to loosen the folds and cause them to expand on being released, so that the cotton will open up and be ripened for picking.

The matter constituting my invention will be defined in the claims.

I will now describe the details of construction of my machine by reference to the accompanying drawings, in which—

Figure 1 represents a side elevation of a cotton-boll opener. Fig. 2 represents a rear end elevation. Fig. 3 represents a top plan view. Fig. 4 represents an end view of one of the pressing-rolls. Fig. 5 represents a top plan view, on enlarged scale, of an adjustable journal-box device for the shaft of a pressing-roll.

The operating parts of my machine are mounted upon a high frame, so that the passage-way between the rolls will be free and unobstructed and so that the machine during its travel over the ground may straddle the rows of cotton-plants.

The frame is composed of the two diverging bars or braces 2 at the top, between which is secured the tongue 1 and which braces are connected by cross-bars 3 and 3ª, as shown in Fig. 3. To the longitudinal diverging brace-bars 2 are secured a pair of front standards 4 and a similar pair of rear standards 6, and these standards are connected at their lower ends by longitudinal bars 5, thereby forming a suitable supporting-frame. To the front ends of the bar 5 are connected stay-rods 7, which are connected at their upper ends to the braces 2.

To the upper sides of these brace-bars 2 is secured a transverse bar 9. A vertical rod 8 is connected at its upper end to bar 9 at each end and is provided with holes 8ª, and at its lower end is connected by rod 10 to the axle 12 or to the sliding cuff 13. Rod 8 and a connecting-rod 10 are provided on each side of the machine. A swingletree 9ª is connected by a link at the desired height in one of the holes 8ª in rod 8 at each side of the machine. The main wheels 11 are secured upon the axles 12, which are held on each side in the sliding cuffs or boxes 13, arranged to slide vertically on the standards 4. Upon the axles at each side are placed the sleeves 12ª, rigidly connected to the wheels 11 and having secured at their inner ends the two sprocket-wheels 14, which are provided for driving the gearing which turns the squeezing-rolls 25.

A pair of upper sprocket-wheels 15 are secured upon the outer ends of the transverse shaft 17, which is mounted in suitable bearings in the upper bars 2 of the frame. The sprocket-chains 16 pass around the wheels 14 and over the wheels 15 for turning shaft 17. Upon the shaft 17 are secured, one on each side of the machine, the beveled gear-wheels 18, which mesh with the beveled wheels 19, fixed upon the vertical shafts 20, as shown in Fig. 2. The shafts 20 are supported in suitable bearings and have secured to their upper ends the horizontal sprocket-wheels 21 for the sprocket-chains 22.

The pair of squeezing or pressing rolls 25 for opening cotton-bolls are mounted on vertical shafts 24 in upper and lower adjustable bearings 26 29 for permitting the rolls to be adjusted nearer to or farther apart and leave a space between them, as shown in Fig. 2. To the upper ends of the shafts 24 are secured the sprocket-wheels 23, around which are passed the chains 22. The sliding frames 26 in frames 29 for carrying the journal-boxes 27 are secured to or supported in the two upper bars 2 and in the lower bars 5. The journal-boxes 27 for the shafts 24 are connected by the opposite pivotal pins 28 to the sliding frame 26, as shown in Fig. 5. The frame 26 is arranged to slide in the supporting-frame and guideway 29. The set-screw 30, passing through the end 29ª, connects with one side of the sliding frame or box 26 for adjusting it in either direction. To the opposite side of the frame 26 are connected two spiral compression-springs 31, which are supported upon rods 31ª, passing through the end 31ᵇ of the frame and provided with heads, as clearly shown in Fig. 5. It will be readily understood that by turning the set-screw 30 the journal-box can be adjusted inward or outward, thereby setting the shafts 24 and rolls 25 closer together or farther apart, so as to produce the desired pressure upon the cotton-bolls. The springs 31 by pressing against sliding frame 26 also provide a yielding bearing for the journals of shaft 24, carrying each roll 25, thereby permitting the rolls to spread outward in case the bolls and stalks passed between them at any time are excessively thick, so that they shall not be bruised or injured by undue pressure.

To the shaft 17 are applied at each end the ratchet-wheels 32, which are engaged by pawls on the sprocket-wheels 15 to control the gearing while the machine is being turned.

A pair of grooved sheet-metal deflectors 33 are secured to the standards 4 and extend inward a short distance between rolls 25, from the top to the bottom thereof, and project outward at the lower ends, as shown in Fig. 1. These grooved deflector-wings serve to raise the stalks of plants which have fallen on the ground and the lower branches and to direct them inward between the pressing-rolls 25, so that all the bolls remaining on the plants shall be squeezed or pressed and caused to open. The deflector-wings are suitably curved for this purpose.

To one side of the brace 2, directly over the axle, is pivotally connected a lever 34 by a pin 34ª. This lever is provided at its lower end with a short arm 35, to which is connected a lifting-rod 39, which connects at its lower end with the sliding cuff or box 13, which carries the axle 12. To the lower end of lever 34 there is secured at 36 a bent rod 40, which carries upon its outer end a roller or idler 42, adapted to bear upon the sprocket-chain 16, as shown in Fig. 3, for tightening the same when the wheels 11 are raised. A pin 41 in the standard 4 serves as a pivotal support for the bent rod 40. A toothed sector-shaped piece 37 is secured to the lever 34 and is engaged by a spring catch or lock 38 for holding the parts in place. A lever 34 and connecting parts, as above described, will preferably be placed on each side of the machine for raising either wheel or both wheels together, as may be required. The driver's seat 43 is secured to a spring-bar 44, which at its lower end is secured by a bolt 45 to one of the cross-bars 3ª. The rolls 25 may be provided with small longitudinal grooves 25ª or otherwise roughened, or they may be covered with bagging to cause them to engage and hold the bolls while passing between the rolls.

This machine is quite simple in construction and can be conveniently operated by a driver or unskilled workman. The pressing-rolls 25 will be adjusted with a suitable vertical opening between them, according to the kind of stalks and bolls to be operated upon, and the driver will drive his team so that the machine will straddle the row of cotton-plants. The stalks and branches will be gathered inward and directed by the deflecting-wings 33 between the pressing-rolls 25 and the bolls thereby gently pressed, so as to loosen them and cause them to spread and open after being released from the rolls.

Having described my invention, what I claim, and desire to secure by Letters Patent, is—

1. A machine for opening cotton-bolls, comprising a pair of upright rolls, free from picking devices and mounted with a space between them and suitable gearing connecting with the axles of the wheels and with the rolls, for revolving them, substantially as described.

2. A machine for opening cotton-bolls, comprising a pair of pressing-rolls free from picking devices, mounted with their axles or journals in yielding journal-boxes for permitting the rolls to spread apart during the passage of bolls and stalks to prevent injury thereto, a supporting-frame on wheels and means for revolving the rolls, substantially as described.

3. A machine for opening cotton-bolls, comprising a pair of upright rolls free from picking devices mounted on shafts, adjustable and yielding journal-bearings for said shafts for setting the rolls toward or away from one another, main driving-wheels having axles carried by the frame of the machine, sprocket-wheels on said axles, and suitable gearing connecting them with the shafts of the rolls, for revolving them, substantially as described.

4. In a machine for opening cotton-bolls, the combination with a supporting-frame, of driving-wheels having axles mounted to slide vertically on the frame, a pair of pressing-rolls free from picking devices and mounted with a space between them in the frame, spring-pressed sliding journal-bearings for the shafts of said rolls, suitable gearing connecting with the main wheels and with shafts of the rolls for revolving them, and means for raising and lowering the machine on the wheels, substantially as described.

5. In a machine for opening cotton-bolls, the combination with the supporting-frame, of driving-wheels having axles connecting at